(12) United States Patent
Ramsey et al.

(10) Patent No.: US 12,341,402 B2
(45) Date of Patent: Jun. 24, 2025

(54) EMOTOR ROTOR CENTERING AND SHIPPING AID WITH ANNULAR DISK AND BOLT HOLES

(71) Applicant: Schaeffler Technologies AG & Co. KG, Herzogenaurach (DE)

(72) Inventors: John Ramsey, Mansfield, OH (US); Michael Condo, Clinton, OH (US); Kolstin Hartzler, Norton, OH (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 333 days.

(21) Appl. No.: 17/875,522

(22) Filed: Jul. 28, 2022

(65) Prior Publication Data

US 2023/0231440 A1    Jul. 20, 2023

Related U.S. Application Data

(60) Provisional application No. 63/301,415, filed on Jan. 20, 2022.

(51) Int. Cl.
*H02K 5/26*        (2006.01)
*B65D 85/68*       (2006.01)
*H02K 5/10*        (2006.01)
*H02K 24/00*       (2006.01)

(52) U.S. Cl.
CPC ............. *H02K 5/26* (2013.01); *B65D 85/68* (2013.01); *H02K 5/10* (2013.01); *H02K 24/00* (2013.01); *B65D 2585/6877* (2013.01)

(58) Field of Classification Search
CPC .......... H02K 5/26; H02K 24/00; H02K 15/00; H02K 15/0006; B65D 85/68; B65D 2585/6877
USPC .......................................................... 310/90
See application file for complete search history.

(56) References Cited

U.S. PATENT DOCUMENTS

| | | | | |
|---|---|---|---|---|
| 917,188 | A | * | 4/1909 | Tirrill .................. H02K 5/00 310/91 |
| 1,319,897 | A | * | 10/1919 | Pearson ................ H02J 7/22 322/100 |
| 3,219,860 | A | * | 11/1965 | Heiny .................. H02K 5/141 310/239 |
| 3,271,601 | A | * | 9/1966 | Raver .................. H02K 11/05 310/58 |

(Continued)

FOREIGN PATENT DOCUMENTS

JP     WO201305227 A1 * 10/2013
KR     20230149487  A * 10/2023

*Primary Examiner* — Maged M Almawri

(57) ABSTRACT

A shipping jig for an e-motor includes a central axis, an annular disk arranged for fixing to a cover of the e-motor, and a cylindrical portion extending axially from the annular disk and arranged for axially and radially positioning a rotor carrier of the e-motor relative to a stator of the e-motor. The annular disk includes a first plurality of holes distributed about a first bolt circle and a second plurality of holes distributed about a second bolt circle, smaller than the first bolt circle. The cylindrical portion may also be arranged for radially positioning a portion of a resolver relative to the stator. The first plurality of holes may each have a same third diameter and the second plurality of holes may each have a same fourth diameter, greater than the same third diameter.

14 Claims, 1 Drawing Sheet

(56) References Cited

U.S. PATENT DOCUMENTS

| | | | | |
|---|---|---|---|---|
| 3,324,383 | A * | 6/1967 | Raver | H02K 11/05 322/73 |
| 3,983,429 | A * | 9/1976 | Allardice, Jr. | H02K 5/24 310/91 |
| 4,033,531 | A * | 7/1977 | Levine | H02K 5/26 248/676 |
| 4,288,712 | A * | 9/1981 | Hagenlocher | H02K 5/26 310/91 |
| 4,506,857 | A * | 3/1985 | Hara | G11B 15/28 |
| 4,835,428 | A * | 5/1989 | Komurasaki | F02B 63/04 310/91 |
| 4,922,151 | A * | 5/1990 | Lewis | H02K 5/26 310/91 |
| 5,019,735 | A * | 5/1991 | Lee | H02K 5/15 310/90 |
| 5,069,415 | A * | 12/1991 | Mechalas | H02K 5/26 248/674 |
| 5,488,259 | A * | 1/1996 | Cho | F16M 5/00 310/91 |
| 5,760,513 | A * | 6/1998 | Morishita | H02K 5/00 310/91 |
| 5,771,516 | A * | 6/1998 | Huang | B25F 3/00 7/138 |
| 5,914,551 | A * | 6/1999 | Kern | H02K 5/1735 310/91 |
| 7,654,742 | B2 * | 2/2010 | Nishimoto | F16C 33/107 384/114 |
| 8,569,919 | B2 * | 10/2013 | Sugimoto | H02K 5/15 310/90 |
| 9,030,067 | B2 * | 5/2015 | Raczek | F16C 35/077 384/510 |
| 9,225,219 | B2 * | 12/2015 | Takahashi | H02K 5/00 |
| 11,522,394 | B2 * | 12/2022 | Payne | B60K 6/36 |
| 11,588,367 | B2 * | 2/2023 | Ho | H02K 7/083 |
| 2003/0066371 | A1 * | 4/2003 | Petocchi | H02K 7/116 74/421 A |
| 2003/0112734 | A1 * | 6/2003 | Shishido | H02K 5/26 720/697 |
| 2003/0178897 | A1 * | 9/2003 | Jun | H02K 7/081 310/90 |
| 2003/0218396 | A1 * | 11/2003 | Hsieh | H02K 9/06 310/90 |
| 2005/0050764 | A1 * | 3/2005 | Jeong | H02K 5/00 34/601 |
| 2006/0091751 | A1 * | 5/2006 | Gaul | H02K 5/26 310/411 |
| 2007/0003419 | A1 * | 1/2007 | Wu | F04D 29/601 417/363 |
| 2007/0084981 | A1 * | 4/2007 | Jentzsch | H02K 5/26 248/309.1 |
| 2008/0122307 | A1 * | 5/2008 | Campbell | H02K 23/56 310/90 |
| 2008/0143201 | A1 * | 6/2008 | Ramy | H02K 5/203 310/58 |
| 2009/0085414 | A1 * | 4/2009 | Itoh | H02K 5/15 310/216.127 |
| 2009/0300905 | A1 * | 12/2009 | Chou | H02K 5/26 29/732 |
| 2010/0176684 | A1 * | 7/2010 | Takahashi | H02K 5/24 310/216.134 |
| 2010/0326397 | A1 * | 12/2010 | Glaesser | H02K 5/15 123/198 R |
| 2011/0115325 | A1 * | 5/2011 | Newberg | H02K 5/15 310/91 |
| 2011/0210630 | A1 * | 9/2011 | Liu | F16C 35/02 310/90 |
| 2012/0017425 | A1 * | 1/2012 | Endo | H02K 15/14 29/596 |
| 2012/0267972 | A1 * | 10/2012 | Leung | H02K 5/15 310/90 |
| 2013/0088109 | A1 * | 4/2013 | Frait | B60K 6/40 310/90 |
| 2013/0099614 | A1 * | 4/2013 | Pettey | H02K 7/08 310/90 |
| 2013/0181559 | A1 * | 7/2013 | Kaneko | F16C 35/062 310/90 |
| 2013/0193790 | A1 * | 8/2013 | Rittmeyer | F16C 35/077 310/90 |
| 2014/0028136 | A1 * | 1/2014 | Cemke | H02K 7/14 310/91 |
| 2014/0117785 | A1 * | 5/2014 | Furukawa | H02K 7/1876 310/15 |
| 2015/0318754 | A1 * | 11/2015 | Nishikawa | H02K 15/50 310/90 |
| 2015/0349606 | A1 * | 12/2015 | Filzen | H02K 7/116 74/413 |
| 2016/0126803 | A1 * | 5/2016 | Rentz | H02K 5/26 310/12.33 |
| 2016/0294249 | A1 * | 10/2016 | Keller | B23K 26/28 |
| 2017/0248268 | A1 * | 8/2017 | Copanas | F16M 5/00 |
| 2019/0199163 | A1 * | 6/2019 | Baer | H02K 15/14 |
| 2020/0343786 | A1 * | 10/2020 | Chuang | F16B 23/0084 |
| 2020/0381978 | A1 * | 12/2020 | Onishi | H02K 5/26 |
| 2020/0393036 | A1 * | 12/2020 | Steinberger | F16H 57/02 |
| 2021/0099049 | A1 * | 4/2021 | Battistella | B60K 7/0007 |

* cited by examiner

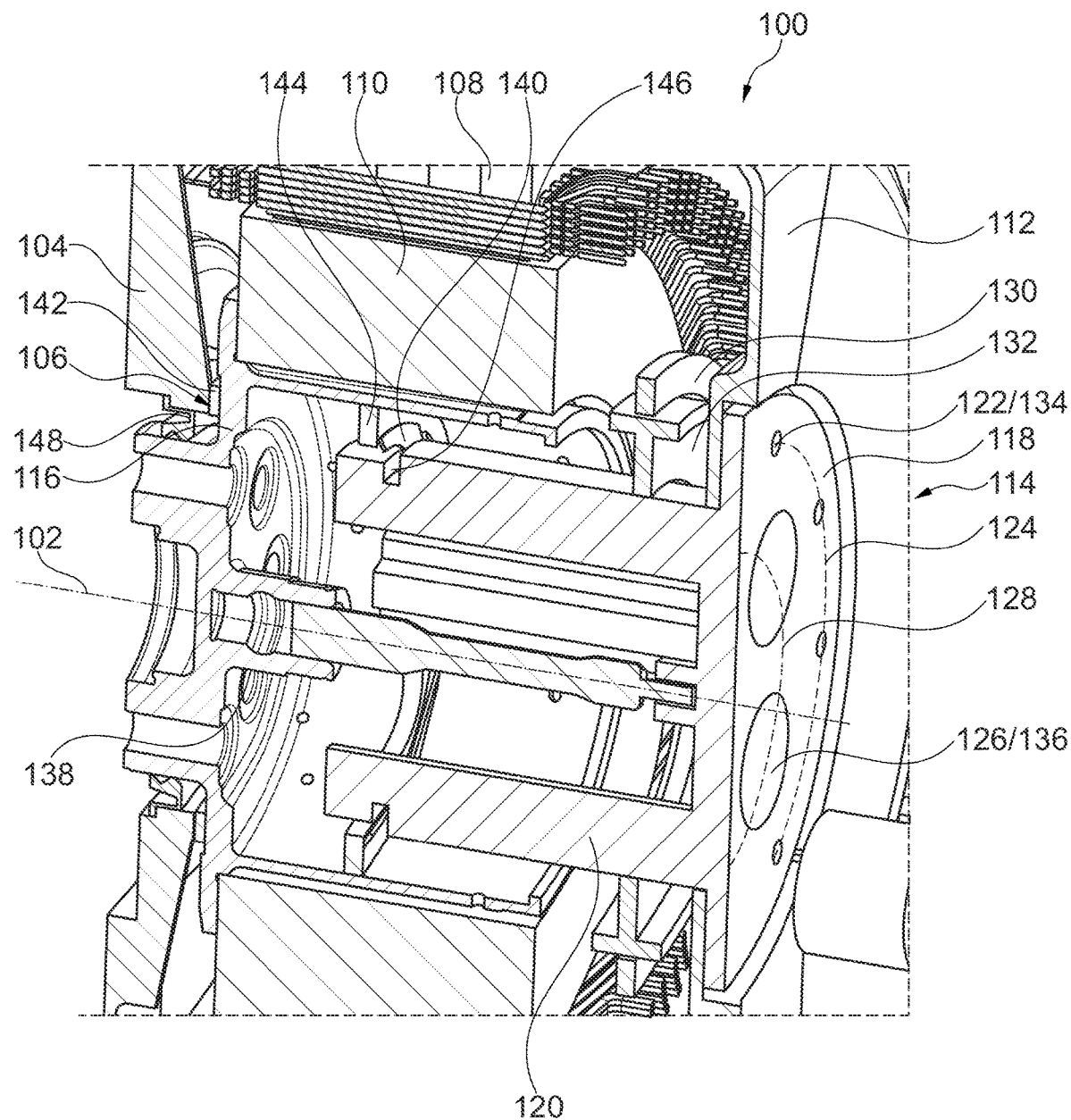

EMOTOR ROTOR CENTERING AND SHIPPING AID WITH ANNULAR DISK AND BOLT HOLES

CROSS-REFERENCE TO RELATED APPLICATIONS

This application claims the benefit of U.S. Provisional Patent Application No. 63/301,415, filed Jan. 20, 2022, the disclosure of which is incorporated in its entirety by reference herein.

TECHNICAL FIELD

The present disclosure relates generally to a shipping jig, and more specifically to a shipping jig for an e-motor and an e-motor assembly including the shipping jig.

BACKGROUND

Shipping jigs are known. One example is shown and described in commonly-assigned United States Patent Application Publication No. 2020/0393036 titled HYBRID MODULE SHIPPING STRAP to Steinberger et al.

SUMMARY

Example embodiments broadly comprise a shipping jig for an e-motor including a central axis, an annular disk arranged for fixing to a cover of the e-motor, and a cylindrical portion extending axially from the annular disk and arranged for axially and radially positioning a rotor carrier of the e-motor relative to a stator of the e-motor. The annular disk includes a first plurality of holes distributed about a first bolt circle and a second plurality of holes distributed about a second bolt circle, smaller than the first bolt circle. In an example embodiment, the cylindrical portion is also arranged for radially positioning a portion of a resolver relative to the stator. In an example embodiment, the first plurality of holes each have a same third diameter and the second plurality of holes each have a same fourth diameter, greater than the same third diameter.

In some example embodiments, the shipping jig has a spring element arranged for axially pressing the rotor carrier towards a housing of the e-motor. In some example embodiments, the spring is arranged to press against a radially inwardly extending portion of the rotor carrier. In an example embodiment, the cylindrical portion has a groove and the shipping jig has a snap ring installed in the groove for compressing the spring against the radially inwardly extending portion.

Another example embodiment broadly comprises an e-motor assembly including a central axis, a housing with a radial wall, a stator fixed in the housing, a rotor arranged radially inside of the stator, a cover, a shipping jig and a plurality of fasteners. The rotor has a rotor carrier and the cover is fixed to the housing such that the rotor carrier is arranged between the radial wall and the cover. The shipping jig has an annular disk and a cylindrical portion extending axially from the annular disk for axially and radially positioning the rotor carrier relative to the stator. The annular disk has a first plurality of holes distributed about a first bolt circle and a second plurality of holes distributed about a second bolt circle, smaller than the first bolt circle. The plurality of fasteners is installed in the first plurality of holes to fix the annular disk to the cover. In an example embodiment, the e-motor assembly includes a resolver, and the cylindrical portion also radially positions a portion of the resolver relative to the stator.

In some example embodiments, the first plurality of holes each have a same third diameter, and the second plurality of holes each have a same fourth diameter, greater than the same third diameter. In some example embodiments, the rotor carrier has a third plurality of holes arranged for fixing the rotor carrier to a crankshaft of a combustion engine, and the third plurality of holes are distributed about the second bolt circle. In some example embodiments, a number of holes in the third plurality of holes is greater than a number of holes in the second plurality of holes. In an example embodiment, the same fourth diameter is sized for receiving a tool for tightening a second plurality of fasteners in the third plurality of holes to fix the rotor carrier to the crankshaft.

In some example embodiments, the shipping jig has a spring element that axially presses the rotor carrier towards the radial wall. In an example embodiment, the e-motor assembly has an anti-wear disk disposed axially between the rotor carrier and the radial wall. In some example embodiment, the rotor carrier has a radially inwardly extending ring and the spring presses against the radially inwardly extending ring. In an example embodiment, the cylindrical portion has a groove and the shipping jig has a snap ring installed in the groove for compressing the spring against the radially inwardly extending ring.

In an example embodiment, the e-motor assembly has a lip seal fixed in the housing for sealing the housing to the rotor carrier.

BRIEF DESCRIPTION OF THE DRAWINGS

The single FIGURE illustrates a partial perspective cross-sectional view of an e-motor assembly according to an example embodiment.

DETAILED DESCRIPTION

Embodiments of the present disclosure are described herein. It should be appreciated that like drawing numbers appearing in different drawing views identify identical, or functionally similar, structural elements. Also, it is to be understood that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the FIGURES can be combined with features illustrated in one or more other FIGURES to produce embodiments that are not explicitly illustrated or described. The combinations of features illustrated provide representative embodiments for typical applications. Various combinations and modifications of the features consistent with the teachings of this disclosure, however, could be desired for particular applications or implementations.

The terminology used herein is for the purpose of describing particular aspects only, and is not intended to limit the scope of the present disclosure. Unless defined otherwise, all technical and scientific terms used herein have the same meaning as commonly understood to one of ordinary skill in the art to which this disclosure belongs. Although any methods, devices or materials similar or equivalent to those described herein can be used in the practice or testing of the disclosure, the following example methods, devices, and materials are now described.

The following description is made with reference to the single FIGURE. The single FIGURE illustrates a partial perspective cross-sectional view of e-motor assembly 100. E-motor assembly 100 includes a central axis 102, housing 104 with radial wall 106, stator 108 fixed in the housing, rotor 110 arranged radially inside of the stator, cover 112, shipping jig 114 and fasteners (not shown). The rotor includes rotor carrier 116, and the cover is fixed to the housing such that the rotor carrier is arranged between the radial wall and the cover.

Shipping jig 114 includes annular disk 118 and cylindrical portion 120 extending axially from the annular disk for axially and radially positioning the rotor carrier relative to the stator as described below. The annular disk includes holes 122 distributed about bolt circle 124 and holes 126 distributed about bolt circle 128. As can be seen in the FIGURE, bolt circle 128 is less than bolt circle 124. Fasteners (not shown) are installed in holes 122 to fix the annular disk to the cover. As can be seen in the FIGURE, the cover has a stepped portion and the annular disk is installed in the stepped portion. Assembly 100 also includes resolver 130 and the cylindrical portion also radially positions portion 132 of the resolver (i.e., resolver rotor) relative to the stator. A stationary portion of the resolver (i.e., resolver stator) may be fixed to the cover or the stator, for example.

Holes 122 each have same diameter 134 and holes 126 each have same diameter 136, greater than diameter 134. In other words, all of holes 122 have the same diameter and all of holes 126 have the same diameter, but the diameter of holes 126 is greater than the diameter of holes 122. Rotor carrier 116 includes holes 138 arranged for fixing the rotor carrier to a crankshaft (not shown) of a combustion engine (not shown). Holes 138 are distributed about bolt circle 128. A number of holes 138 is greater than a number of holes 126. For example, a number of holes 138 may be exactly twice as many as a number of holes 126. Therefore, the rotor carrier can be rotated relative to the cover so that one half of holes 126 are axially aligned with holes 138 so that a first half of the fasteners can be installed, and then rotated again so that the other half of holes 126 are axially aligned with holes 138 so that the second half of the fasteners can be installed. Diameter 136 is sized for receiving a tool (not shown) for tightening fasteners (not shown) in holes 138 to fix the rotor carrier to the crankshaft. In other words, the e-motor assembly may be assembled to a combustion engine with the shipping jig installed.

Shipping jig 114 also includes spring element 140 that axially presses the rotor carrier towards the radial wall, and assembly 100 includes anti-wear disk 142 disposed axially between the rotor carrier and the radial wall. Therefore, when fasteners in holes 122 are tightened, disk 118 is pulled against cover 112 and spring element 140 is compressed. Spring element 140 may be a belleville washer or diaphragm spring, for example. Disk 142 prevents damage between carrier 116 and housing 104 when the assembly is subjected to jostling during transport, for example. Rotor carrier 116 includes radially inwardly extending ring, or radially inwardly extending protrusion, 144, and the spring element presses against the radially inwardly extending ring. Ring 144 may be a machined feature of rotor carrier 116, for example. Cylindrical portion 120 includes groove 146 the shipping jig has a snap ring (not shown) installed in the groove for compressing the spring element against the radially inwardly extending ring.

Assembly 100 also includes lip seal 148 fixed in the housing for sealing the housing to the rotor carrier. That is, the lip seal seals to the rotatable rotor carrier to the housing to prevent fluid and/or debris from damaging the electric motor and other components.

Use of the shipping jig prevents damage to the components of the assembly during transport from a manufacturing facility to an assembly facility, for example. When installed, shipping jig 114 provides radial and axial positioning of the rotor to protect the lip seal, rotor, stator, and resolver components and maintains an air gap between the rotor and stator. Once installed on a combustion engine, radial positioning between the stator and rotor is maintained so that the shipping jig may be removed without risk of damaging the components, and another component (e.g., a gerotor pump) may be installed inside the rotor carrier.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the disclosure that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

REFERENCE NUMERALS

100 E-motor assembly
102 Central axis
104 Housing
106 Radial wall
108 Stator
110 Rotor
112 Cover
114 Shipping jig
116 Rotor carrier
118 Annular disk
120 Cylindrical portion
122 Holes (first)
124 Bolt circle (first)
126 Holes (second)
128 Bolt circle (second)
130 Resolver
132 Portion of resolver
134 Diameter (first)
136 Diameter (second)
138 Holes (third)
140 Spring element 142 Anti-wear disk
144 Radially inwardly extending ring/portion
146 Groove
148 Lip seal

What is claimed is:

1. A shipping jig for an e-motor, comprising:
    a central axis;
    an annular disk arranged for fixing to a cover of the e-motor, comprising:
        a first plurality of holes distributed about a first bolt circle; and
        a second plurality of holes distributed about a second bolt circle, smaller than the first bolt circle;
    a cylindrical portion extending axially from the annular disk and arranged for axially and radially positioning a rotor carrier of the e-motor relative to a stator of the e-motor; and
    a spring element arranged for axially pressing a radially inwardly extending portion of the rotor carrier towards a housing of the e-motor.

2. The shipping jig of claim 1 wherein the cylindrical portion is also arranged for radially positioning a portion of a resolver relative to the stator.

3. The shipping jig of claim 1 wherein:
    the first plurality of holes each comprise a same third diameter; and
    the second plurality of holes each comprise a same fourth diameter, greater than the same third diameter.

4. The shipping jig of claim 1 wherein:
    the cylindrical portion comprises a groove; and
    the shipping jig further comprises a snap ring installed in the groove for compressing the spring element against the radially inwardly extending portion.

5. An e-motor assembly comprising:
    a central axis;
    a housing comprising a radial wall;
    a stator fixed in the housing;
    a rotor arranged radially inside of the stator, the rotor comprising a rotor carrier;
    a cover fixed to the housing such that the rotor carrier is arranged between the radial wall and the cover;
    a shipping jig comprising:
        an annular disk comprising:
            a first plurality of holes distributed about a first bolt circle, the first plurality of holes each comprising a same third diameter; and
            a second plurality of holes distributed about a second bolt circle, smaller than the first bolt circle, the second plurality of holes each comprising a same fourth diameter, greater than the same third diameter; and
        a cylindrical portion extending axially from the annular disk for axially and radially positioning the rotor carrier relative to the stator; and
    a plurality of fasteners installed in the first plurality of holes to fix the annular disk to the cover, wherein the rotor carrier comprises a third plurality of holes distributed about the second bolt circle and arranged for fixing the rotor carrier to a crankshaft of a combustion engine.

6. The e-motor assembly of claim 5 further comprising a resolver, wherein the cylindrical portion also radially positions a portion of the resolver relative to the stator.

7. The e-motor assembly of claim 5 further comprising a lip seal fixed in the housing for sealing the housing to the rotor carrier.

8. The e-motor assembly of claim 5 wherein a number of holes in the third plurality of holes is greater than a number of holes in the second plurality of holes.

9. The e-motor assembly of claim 8 wherein the same fourth diameter is sized for receiving a tool for tightening a second plurality of fasteners in the third plurality of holes to fix the rotor carrier to the crankshaft.

10. The e-motor assembly of claim 5 wherein the shipping jig further comprises a spring element that axially presses the rotor carrier towards the radial wall.

11. The e-motor assembly of claim 10 further comprising an anti-wear disk disposed axially between the rotor carrier and the radial wall.

12. The e-motor assembly of claim 10 wherein:
    the rotor carrier comprises a radially inwardly extending ring; and
    the spring element presses against the radially inwardly extending ring.

13. The e-motor assembly of claim 12 wherein:
    the cylindrical portion comprises a groove; and
    the shipping jig further comprises a snap ring installed in the groove for compressing the spring element against the radially inwardly extending ring.

14. An e-motor assembly comprising:
    a central axis;
    a housing comprising a radial wall;
    a stator fixed in the housing;
    a rotor arranged radially inside of the stator, the rotor comprising a rotor carrier;
    a cover fixed to the housing such that the rotor carrier is arranged between the radial wall and the cover;
    an anti-wear disk disposed axially between the rotor carrier and the radial wall
    a shipping jig comprising:
        an annular disk comprising:
            a first plurality of holes distributed about a first bolt circle; and
            a second plurality of holes distributed about a second bolt circle, smaller than the first bolt circle; and
        a cylindrical portion extending axially from the annular disk for axially and radially positioning the rotor carrier relative to the stator; and
    a plurality of fasteners installed in the first plurality of holes to fix the annular disk to the cover.

* * * * *